United States Patent
Ok et al.

(10) Patent No.: US 7,583,318 B2
(45) Date of Patent: Sep. 1, 2009

(54) APPARATUS AND METHOD FOR CONTROLLING HUE AND LUMINANCE IN IMAGE DISPLAY DEVICE

(75) Inventors: Hyun-wook Ok, Goyang-si (KR); Seong-deok Lee, Suwon-si (KR); Chang-yeong Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 612 days.

(21) Appl. No.: 11/229,642

(22) Filed: Sep. 20, 2005

(65) Prior Publication Data

US 2006/0061588 A1 Mar. 23, 2006

(30) Foreign Application Priority Data

Sep. 20, 2004 (KR) .................. 10-2004-0074938

(51) Int. Cl.
- H04N 9/64 (2006.01)
- H04N 9/67 (2006.01)
- H04N 7/01 (2006.01)
- H04N 11/20 (2006.01)
- H04N 9/77 (2006.01)
- G09G 5/02 (2006.01)
- G03F 3/08 (2006.01)
- G06K 9/00 (2006.01)

(52) U.S. Cl. .................. 348/453; 348/577; 348/649; 348/661; 348/664; 345/589; 358/520; 382/167

(58) Field of Classification Search .................. 348/577, 348/649, 661, 664; 345/589, 603, 604; 358/520; 382/167
See application file for complete search history.

(56) References Cited

U.S. PATENT DOCUMENTS

| | | | | |
|---|---|---|---|---|
| 4,091,411 A | * | 5/1978 | Sanada et al. | 348/605 |
| 4,562,460 A | * | 12/1985 | Harwood | 348/651 |
| 4,862,251 A | * | 8/1989 | Belmares-Sarabia et al. | 348/577 |
| 5,450,216 A | * | 9/1995 | Kasson | 358/518 |
| 5,450,217 A | * | 9/1995 | Eschbach et al. | 358/518 |
| 5,875,260 A | * | 2/1999 | Ohta | 382/162 |

(Continued)

FOREIGN PATENT DOCUMENTS

JP 9-312777 12/1997

(Continued)

OTHER PUBLICATIONS

Korean Office Action issued Apr. 27, 2006 with respect to Korean Application No. 2004-74938 filed on Sep. 20, 2004.

(Continued)

*Primary Examiner*—Brian P Yenke
(74) *Attorney, Agent, or Firm*—Staas & Halsey LLP (57) ABSTRACT

An apparatus for converting input image signals into image signals that can be displayed in an image display device. The image display device includes a color space converter converting color components of the input image signals and color components that can be displayed in the image display device into color space, a hue control variable calculator comparing a converted color gamut with each other to calculate a hue control variable, and a hue controller controlling hues of the input image signals using the hue control variable.

13 Claims, 8 Drawing Sheets
(3 of 8 Drawing Sheet(s) Filed in Color)

U.S. PATENT DOCUMENTS

| | | | |
|---|---|---|---|
| 6,441,869 B1 * | 8/2002 | Edmunds | 348/651 |
| 6,459,436 B1 * | 10/2002 | Kumada et al. | 345/590 |
| 6,462,786 B1 * | 10/2002 | Glen et al. | 348/599 |
| 6,515,714 B1 * | 2/2003 | Tachibana | 348/654 |
| 6,721,069 B1 * | 4/2004 | Harrington | 358/3.2 |
| 6,775,028 B1 * | 8/2004 | Reel | 358/1.9 |
| 6,828,981 B2 * | 12/2004 | Richardson | 345/590 |
| 6,882,445 B1 * | 4/2005 | Takahashi et al. | 358/1.9 |
| 6,980,219 B2 * | 12/2005 | Higgins | 345/589 |
| 6,992,683 B2 * | 1/2006 | Shin et al. | 345/589 |
| 7,015,927 B2 * | 3/2006 | Matsushiro et al. | 345/600 |
| 7,042,521 B2 * | 5/2006 | Kim | 348/645 |
| 7,102,695 B2 * | 9/2006 | Han et al. | 348/673 |
| 7,167,277 B2 * | 1/2007 | Shimizu et al. | 358/1.9 |
| 7,196,735 B2 * | 3/2007 | Braun | 348/649 |
| 7,231,085 B2 * | 6/2007 | Aotsuka | 382/167 |
| 7,289,164 B2 * | 10/2007 | White | 348/649 |
| 2003/0039372 A1 * | 2/2003 | Tsutsumi et al. | 381/107 |
| 2004/0170319 A1 * | 9/2004 | Maurer | 382/167 |
| 2005/0083345 A1 * | 4/2005 | Higgins | 345/600 |
| 2005/0083352 A1 * | 4/2005 | Higgins | 345/690 |
| 2005/0219574 A1 * | 10/2005 | Ok et al. | 358/1.9 |
| 2006/0170701 A1 * | 8/2006 | Ok et al. | 345/601 |
| 2007/0035706 A1 * | 2/2007 | Margulis | 353/122 |
| 2008/0037868 A1 * | 2/2008 | Han et al. | 382/169 |

FOREIGN PATENT DOCUMENTS

| | | |
|---|---|---|
| JP | 10-75372 | 3/1998 |
| JP | 2000-184221 | 6/2000 |
| JP | 2000-509516 | 7/2000 |

OTHER PUBLICATIONS

Office Action issued in corresponding Japanese Patent Application No. 2005-272295, on Jul. 24, 2007.

* cited by examiner

APPARATUS AND METHOD FOR CONTROLLING HUE AND LUMINANCE IN IMAGE DISPLAY DEVICE

CROSS-REFERENCE TO RELATED APPLICATION

This application claims benefit under 35 U.S.C. § 119 from Korean Patent Application No. 10-2004-0074938, filed on Sep. 20, 2004 in the Korean Intellectual Property Office, the entire content of which is incorporated herein by reference.

BACKGROUND OF THE INVENTION

1. Field of the Invention

The present invention relates to an image display device that displays input images, and more particularly, to an apparatus and method for controlling Hue and luminance of input images depending on color gamut that can be displayed in the image display device.

2. Description of the Related Art

With development of electronics, information provided to a user includes various multimedia information as well as simple text information. The multimedia information includes various formats such as still images, moving images, animation, sound, and the like. Particularly, of the multimedia information, the moving images are based on video on demand (VOD) service or interactive service. Therefore, studies of the standard related to the moving images are actively being carried out.

With development of digital electronics, conventional analog data have been digitalized. Various digital image processing technologies have been developed to efficiently process such huge data. The digital image processing technologies have the following advantages.

First, noise is included in the original signals of all the analog devices when some function is carried out. Therefore, after the noise is processed, images displayed by the finally recorded result may be degraded. However, the digital image processing device prevents the images from being degraded.

Second, since signals are digitalized, signal processing can be made based on computer. As a result, it is possible to compress image data.

The digital image processing technology is directed to how to display analog results recorded in a medium using a computer. Digital images have been embodied through a digital video interactive (DVI) method suggested since the latter half of 1980 by RCA research members. The DVI method is to implement a function, which is difficult to be processed in real time using a general processor, using a specific processor that implements a command suitable for microprogrammable image processing.

Furthermore, two experts groups of junction pictures experts group (JPEG) and motion pictures experts group (MPEG) handled since 1989 have determined a standard coding method which is difficult to be implemented in hardware but has more excellent performance than the DVI method. Such a coding method is expected to carry out a main role in development of digital images in the future because most of business entities support the coding method. Particularly, in case of the MPEG standard, the standards such as MPEG II and MPEG III have been developed for the purpose of digitalization of a high definition system such as HDTV as well as image processing for personal computers.

Moreover, technology that processes images using a main processor only without separate hardware has been introduced since 1991. Examples of such technology include QuickTime by Apple, Video for Windows by Microsoft, and Indeo by Intel Corporation. Such image processing technology has received much attention in a personal computer owing to a main processor that requires high speed.

Standardized work is also carried out with introduction of various digital image processing technologies. In accordance with such standardized work, the digital image processing technologies are not limited to the image conference system, the digital broadcasting codec system and the image telephone technology but widely compatible with computer industries and communication industries. For example, the digital image compression technology that stores data in either an optical disk such as CD-ROM or a digital recording medium is implemented by the technology almost the same as the compression technology for image communication. At present, the standardization of MPEG is handled by ISO-IEC, JTC1, SC1, and WG11, and the standardization work is in progress until now after starting of the experts groups in the 1990's.

However, image signals according to the related art are processed in three-dimensional color spaces of red (R), green (G), and blue (B) and are displayed using a light source of three colors. This is because that the three colors of R, G, and B are primary colors constituting all the colors.

Generally, a display based on a light source of three colors of R, G, and B displays all the colors using combination of R, G, and B. In this case, it is insufficient to display a synthetic color on color coordinates using R, G, and B. This is because that a color gamut actually visible to ordinary sight is greater than a color gamut of R, G, and B. Therefore, if a color other than three colors of R, G and B is added to display colors visible to ordinary sight well, it is possible to display more natural colors.

Figure 1:
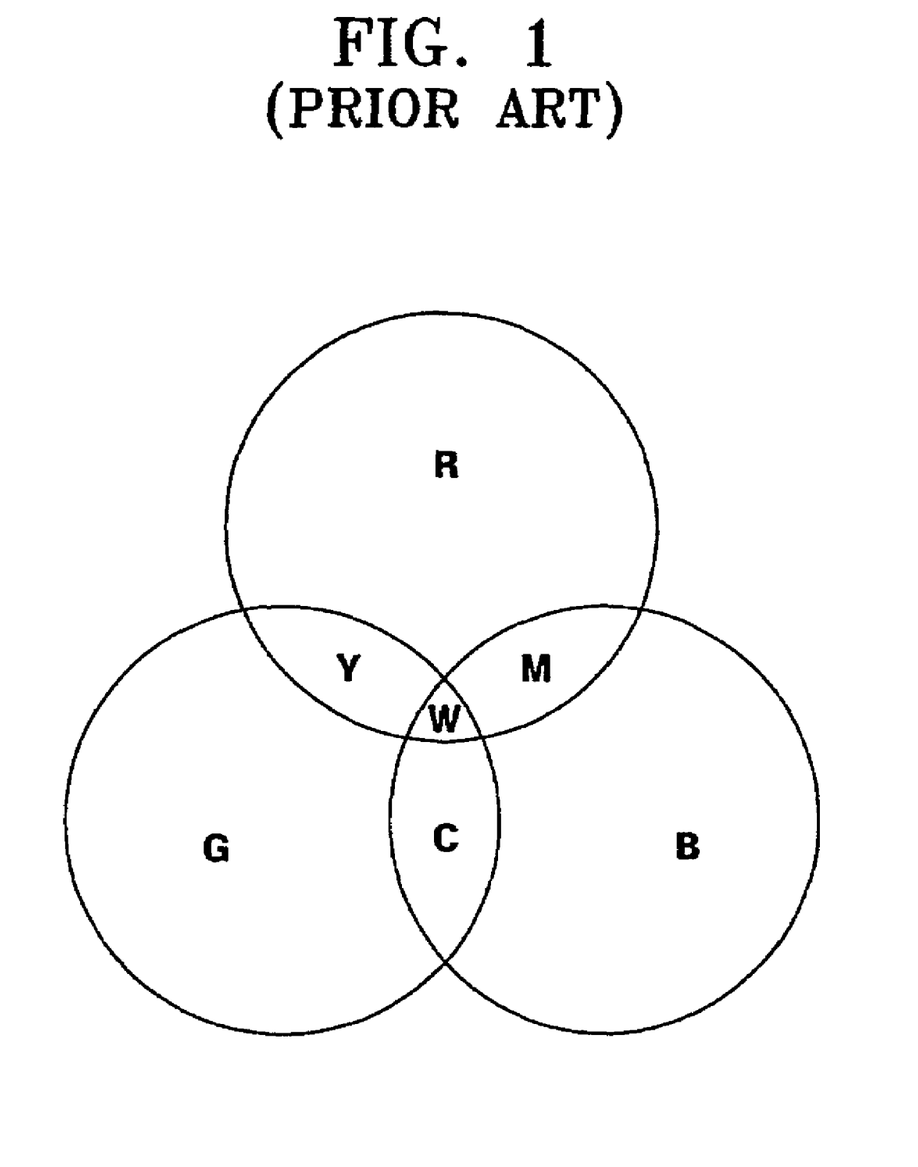
FIG. 1 illustrates the relation among primary colors used to display colors.

FIG. 1 illustrates the relation among primary colors used to display colors. Referring to FIG. 1, all the color signals can be displayed by combination of three primary colors of R, G and B. In this case, if a color signal R is mixed with a color signal G, a color signal Y(Yellow) is obtained. If the color signal G is mixed with a color signal B, a color signal C(Cyan) is obtained. If the color signal B is mixed with the color signal R, a color signal M(Magenta) is obtained. If the primary colors of R, G and B are mixed with one another, a white color signal W is obtained.

Figure 2:
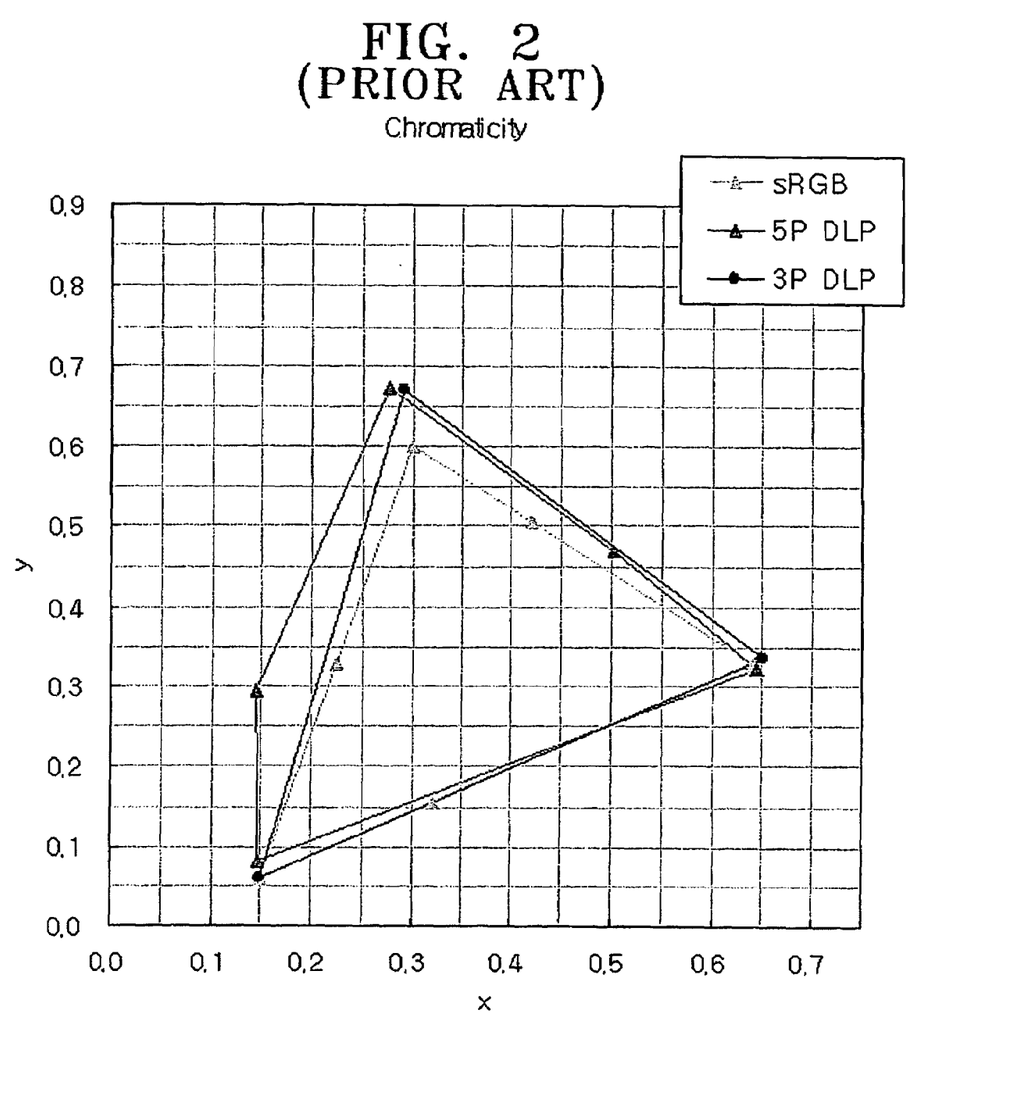
FIG. 2 illustrates color coordinates suggested in the HDTV standard and color coordinates that can be displayed in an image display device.

FIG. 2 illustrates color coordinates. FIG. 2 illustrates a color coordinate sRGB suggested in the HDTV standard, a color coordinate 3P DLP (Digital Light Processing) of a TV currently selling in the market, and a color coordinate 5P DLP of an image display device driven by five colors. The color coordinates shown in FIG. 2 have different formats from one another. That is, a color gamut;(corresponding to the color coordinate suggested in the HDTV standard) of a signal input to the image display device is different from color gamuts (corresponding to the color coordinate currently selling in the market and the color coordinate of the image display device driven by five colors) that can be displayed in the image display device.

Figure 3:
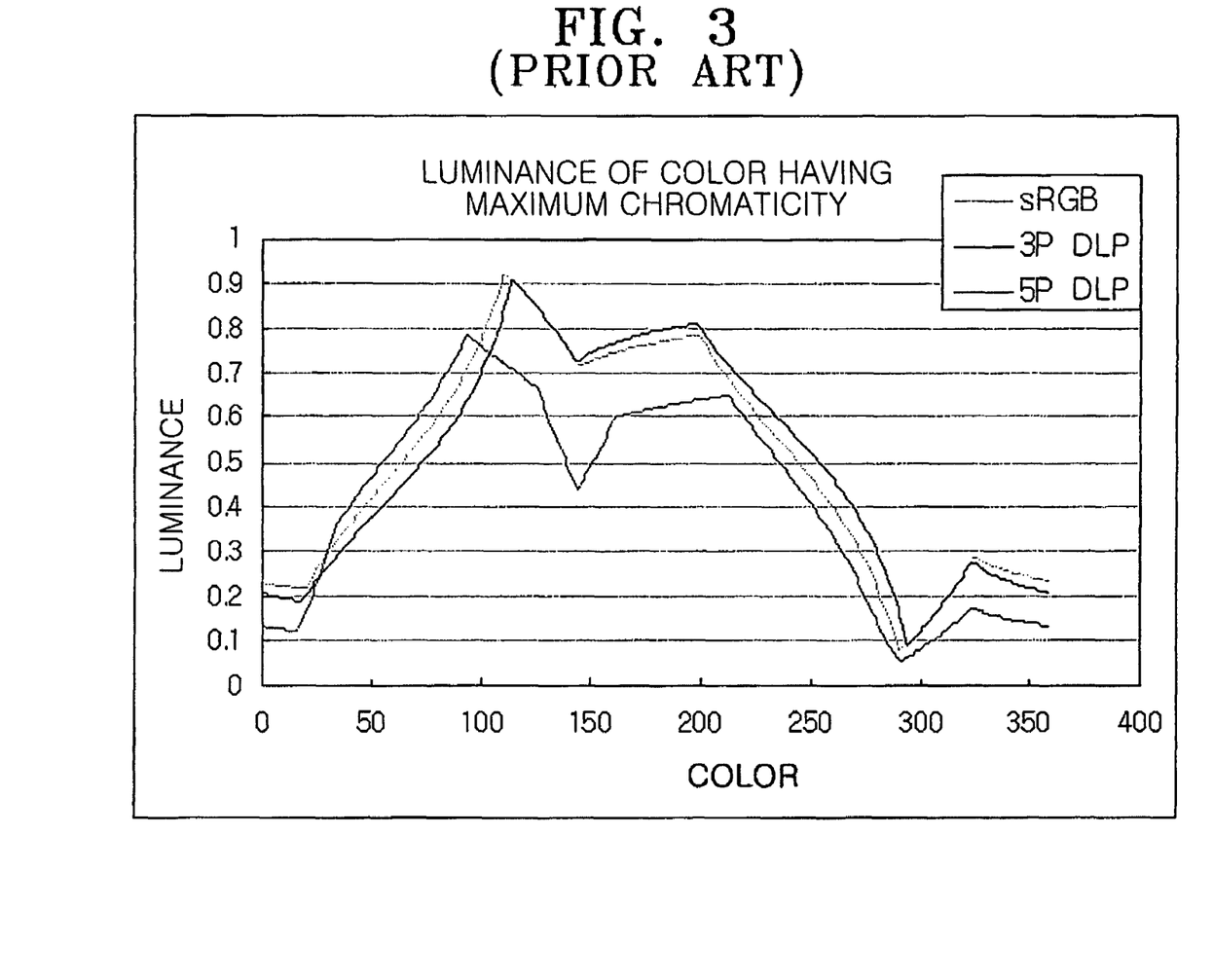
FIG. 3 illustrates the relation between hue and luminance of a signal having the maximum chromaticity.

FIG. 3 illustrates the signal input to the image display device and the signal that can be processed in the image display device. Particularly, FIG. 3 illustrates luminance and hue of a signal having the maximum chromaticity for each signal. As shown in FIG. 3, luminance and hue of the signal input to the image display device do not coincide with luminance and hue of the signal that can be displayed in the image display device. Therefore, it is required to convert luminance and hue of the signal input to the image display device into the range of chromaticity and hue of the signal that can be displayed in the image display device.

SUMARY OF THE INVENTION

Additional aspects and/or advantages of the invention will be set forth in part in the description which follows and, in part, will be apparent from the description, or may be learned by practice of the invention.

Accordingly, the present invention is directed to an apparatus and method for controlling hue and luminance in an image display device, which substantially obviates one or more problems due to limitations and disadvantages of the related art.

According to an embodiment of the present invention, a method is provided to convert luminance and hue of input images into luminance and hue that can be displayed in an image display device.

According to another embodiment of the present invention is a method is provided to convert luminance and hue of input images into luminance and hue that can be displayed in an image display device, in which inversion of luminance can be avoided.

To achieve these objects and other advantages and in accordance with the purpose of the invention, as embodied and broadly described herein, a method for converting input image signals into image signals that can be displayed in an image display device includes the steps of converting color components of the input image signals and color components that can be displayed in the image display device into color spaces, comparing the converted color gamut with each other to calculate a hue control variable, and controlling hues of the input image signals using the hue control variable.

In another aspect of the present invention, an apparatus for converting input image signals into image signals that can be displayed in an image display device includes a color space converter converting color components of the input image signals and color components that can be displayed in the image display device into color space, a hue control variable calculator comparing the converted color gamut with each other to calculate a hue control variable, and a hue controller controlling hues of the input image signals using the hue control variable.

BRIEF DESCRIPTION OF THE DRAWINGS

The patent or application file contains at least one drawing executed in color. Copies of this patent or patent application publication with color drawing(s) will be provided by the office upon request and payment of the necessary fee. These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
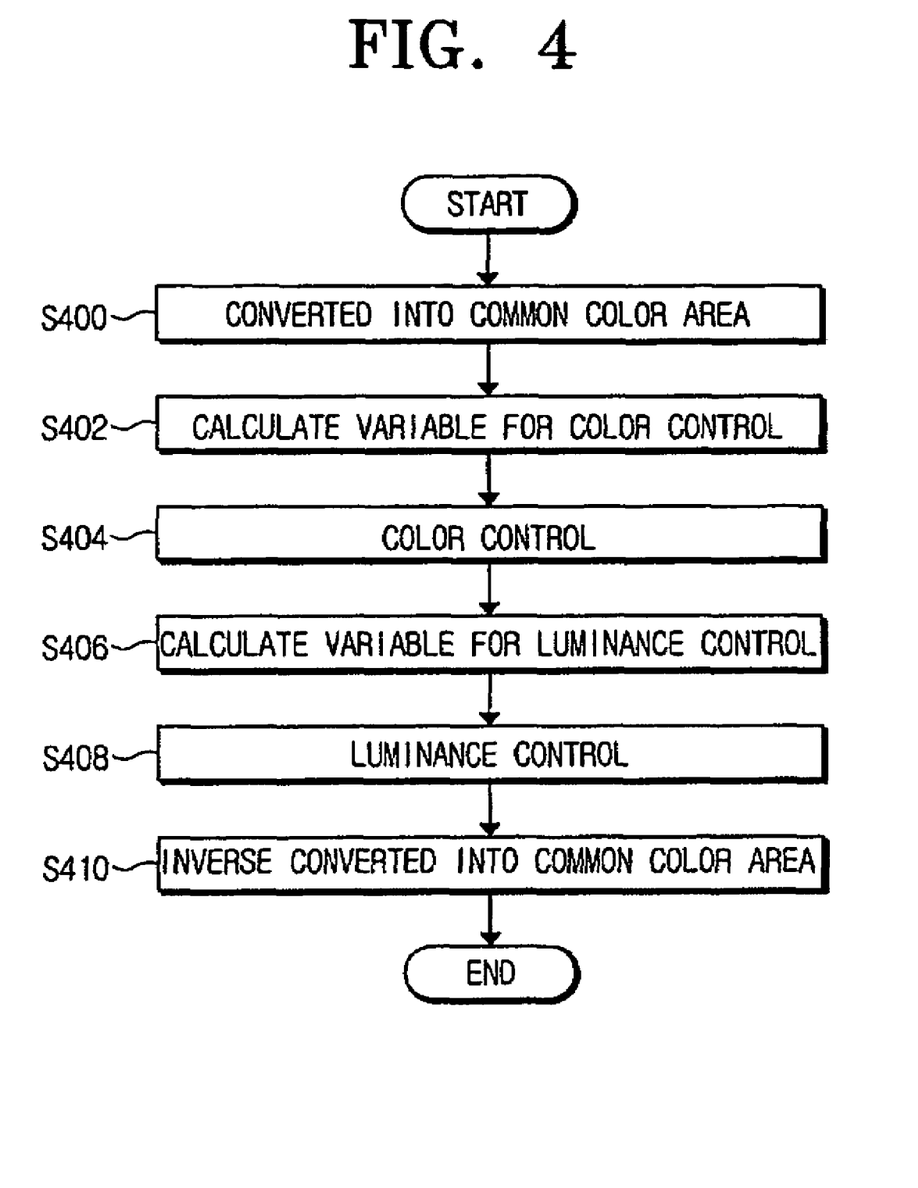
FIG. 4 illustrates a method of controlling hue and luminance in an image display device according to the present invention.

FIG. 4 illustrates a method of converting hue and luminance of input image signals into hue and luminance that can be displayed in an image display device according to an embodiment of the present invention. Hereinafter, the method of converting hue and luminance of input image signals into hue and luminance that can be displayed in the image display device will be described with reference to FIG. 4.

Figure 5:
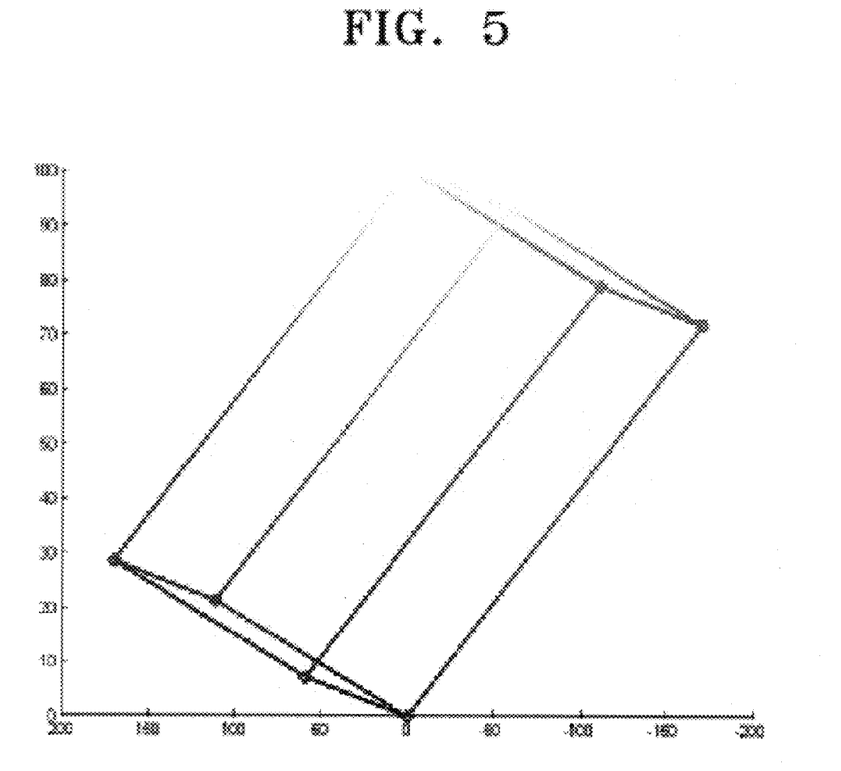
FIG. 5 illustrates a color gamut that can be displayed in three colored components.

In operation S400, the image display device converts input image signals to a common color space. The common color space will be described with reference to FIG. 5 and FIG. 6. FIG. 5 is a graph illustrating a color gamut that can be displayed in three colored components. In FIG. 5, an axis Y represents luminance of colors. Referring to FIG. 5, the color gamut that can be displayed in three colored components constitutes a hexahedron on a three-dimension space using straight lines as axes, the straight lines respectively representing three colored components around the origin (0,0). Hereinafter, chromaticity and hue will be described with reference to FIG. 5.

A straight line is drawn toward the axis Y using "0" on an axis X as a starting point. The distance from the straight line to a specific coordinate toward the axis X represents chromaticity. A rotational angle between a reference point and the specific coordinate around a specific point on the straight line represents hue.

Figure 6:
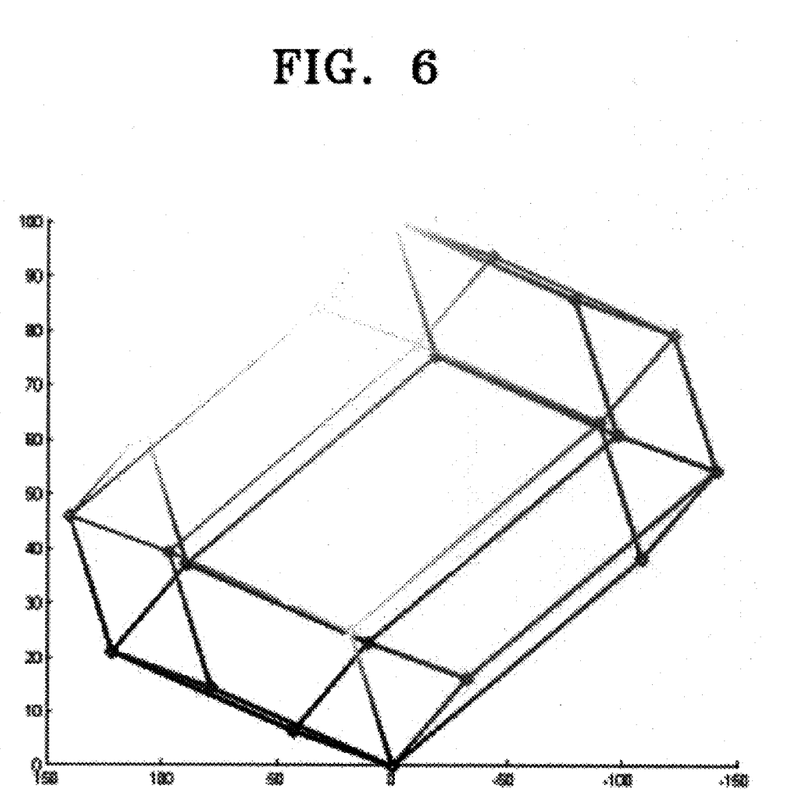
FIG. 6 illustrates a color gamut that can be displayed in five colored components.

FIG. 6 is a graph illustrating a hue space that can be displayed in five colored components. In FIG. 6, an axis Y represents luminance of colors. Referring to FIG. 6, the color gamut that can be displayed in five colored components constitutes an icosahedron on a three-dimension space using straight lines as axes, the straight lines respectively representing five colored components around the origin (0,0). The chromaticity and the hue can be calculated in the same manner as that described in FIG. 5. The relation among hue, luminance and chromaticity can be expressed using the common hue space shown in FIG. 5 and FIG. 6. In other words, the relation between hue and luminance of a signal having the maximum chromaticity can be expressed. As described above, FIG. 3 illustrates the relation between hue and luminance of the signal having the maximum chromaticity.

In operation S402, the image display device calculates a variable for hue control. The procedure of calculating the variable for hue control will be described later. In operation S404, the image display device controls hue of the input signals using the variable calculated in operation S402.

In operation S406, the image display device calculates a variable for luminance control. The procedure of calculating the variable for luminance control will be described later. In operation S408, the image display device controls luminance of the input signals using the variable calculated in operation S406.

In operation S410, the image display device performs inverse conversion of the input signals having the controlled hue and the controlled luminance in the common color space.

Figure 7:
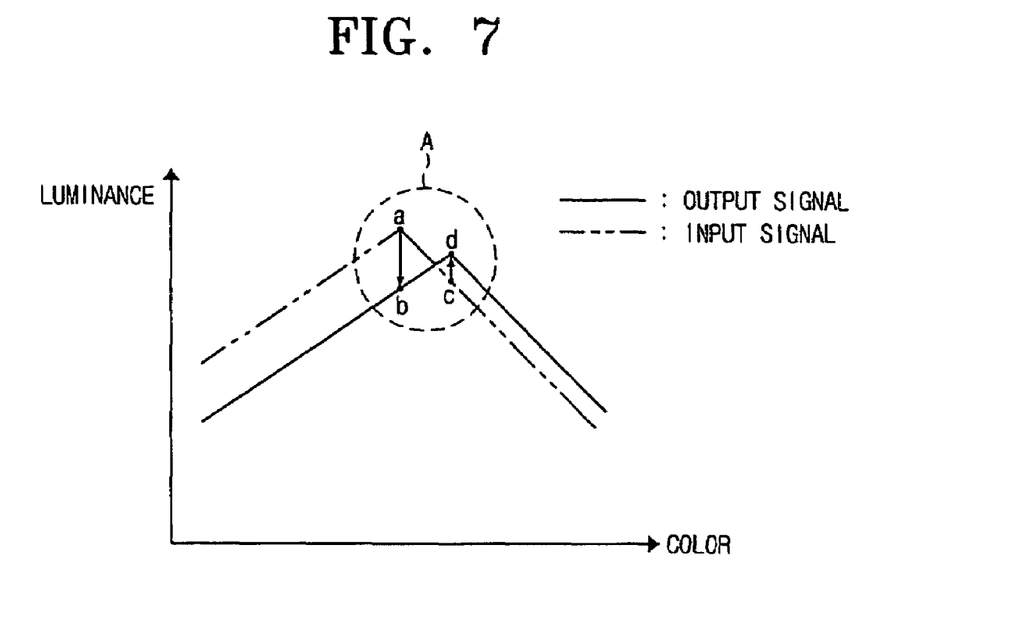
FIG. 7 illustrates a problem that may occur if luminance is only controlled in the image display device.

In FIG. 7, hue and luminance of image signals having the maximum chromaticity are compared with hue and luminance of output signals. The input signals represent the signals input to the image display device, and the output signals represent the signals that can be displayed in the image display device.

The existing technology suggests a method for controlling luminance of input signals in one hue. Hereinafter, a problem that may occur if luminance of the input signals is controlled in at least two hues, and its solution will be described with reference to FIG. 7.

In FIG. 7, "a" and "c" represent color coordinates of input signals, which are expressed as hue and luminance, and "b" and "d" represent color coordinates of output signals corresponding to the color coordinates of the input signals. "a" has higher luminance and lower hue than those of "c" while "b" has lower luminance and higher hue than those of "d". If luminance is controlled in one hue, such a problem does not occur. However, if luminance is controlled in at least two hues, the aforementioned problem occurs. In the present invention, a method of transferring the input signals is suggested to solve such a problem. In other words, there is suggested a method of coinciding a hue corresponding to the maximum value of luminance of the output signals with a hue corresponding to the maximum value of luminance of the input signals. The method will be described with reference to FIG. 8.

Figure 8:
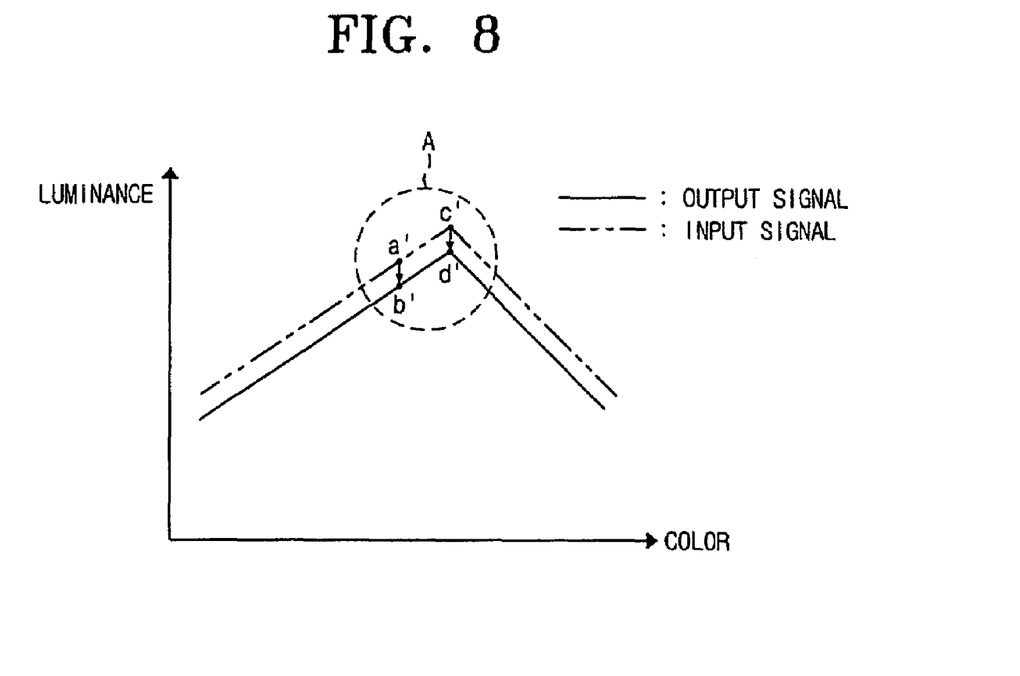
FIG. 8 illustrates the state that the problem of FIG. 7 is obviated by controlling hue in the image display device according to the present invention.

In FIG. 8, "a'" and "c'" represent color coordinates of input signals, and "b'" and "d'" represent color coordinates of output signals corresponding to the color coordinates of the input signals. "c'" has higher luminance and higher hue than those of "a'" while "d'" has higher luminance and higher hue than those of "c'". In other words, the input signals are transferred so that the color coordinates of the input signals corresponding to the color coordinates of the output signals having high luminance have high luminance. In this way, it is possible to avoid inversion of luminance, which may occur if the color gamut of the input signals is converted to be included in the color gamut of the output signals.

Figure 9:
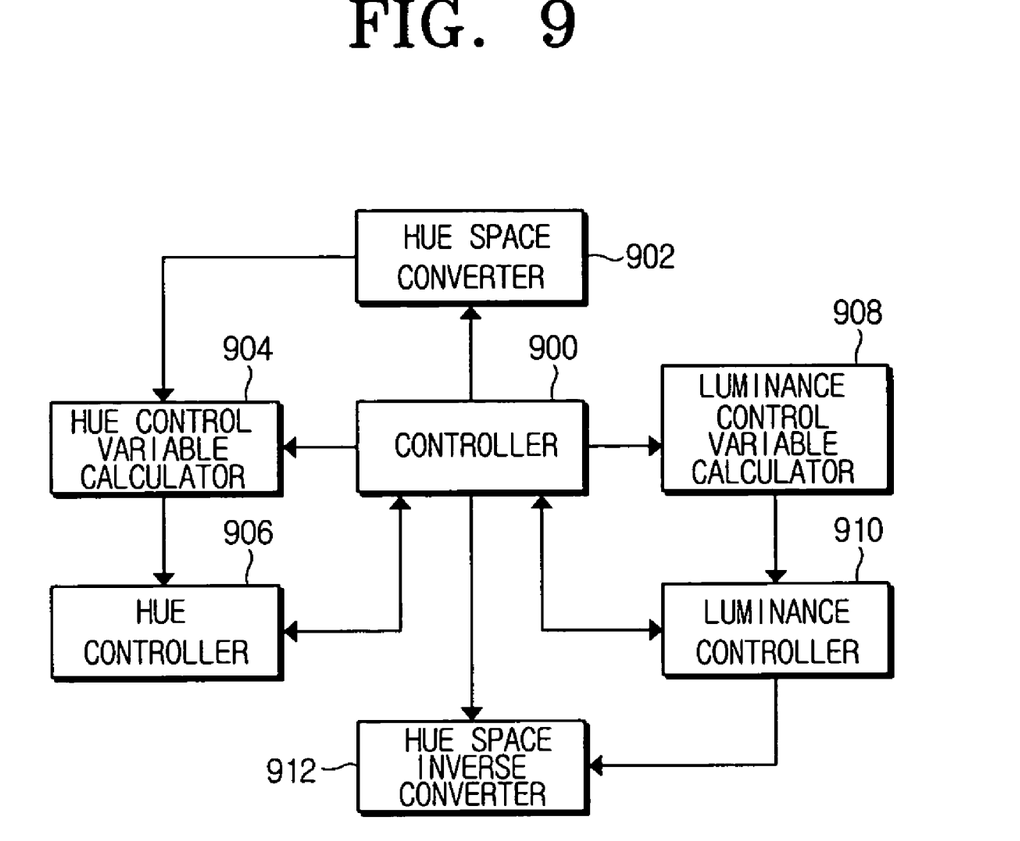
FIG. 9 illustrates elements of the image display device according to the present invention.

FIG. 9 illustrates elements of the image display device according to an embodiment of the present invention. The operation of the elements of the image display device will be described in detail. The image display device includes a controller 900, a color space converter 902, a hue control variable calculator 904, a hue controller 906, a luminance control variable calculator 908, a luminance controller 910, and a color space inverse converter 912. It is apparent that the image display device further includes other elements in addition to the above elements. The above elements will now be described.

The color space converter 902 converts color components of image signals input by a control command into color spaces. The color space converter 902 converts the color components that can be displayed in the image display device into color spaces. The procedure of converting the color components into the color space is the same as that described in FIG. 5 and FIG. 6. In other words, the color space converter 902 outputs the relation (color space) between hue and luminance of an image signal having the maximum chromaticity among the input image signals. The color space converter 902 transfers the relation between hue and luminance of the image signal converted into the color space to the color control variable calculator 904.

The hue control variable calculator 904 compares the relation between hue and luminance of the color space transferred from the color space converter 902 with the relation between hue and luminance of the image signal having the maximum chromaticity among the image signals that can be displayed in the image display device, so as to calculate the hue control variable. In other words, the hue control variable calculator 904 calculates the hue control variable to allow the color coordinates of the image signals corresponding to the color coordinates having high luminance among the image signals that can be displayed in the image display device to obtain high luminance. The hue control variable means the distance of the hue of the transferred image signal to coincide the hue of the color coordinates having the maximum luminance among the image signals that can be displayed in the image display device with the hue of the color coordinates having the maximum luminance of the transferred image signal. The calculated hue control variable is transferred to the hue controller 906.

The hue controller 906 controls the hue of the transferred image signal using the hue control variable transferred from the hue control variable calculator 904. Although the hue controller 906 and the hue control variable calculator 904 are separately provided in FIG. 9, it is apparent that they may be provided in a single body.

The image signal whose hue has been controlled by the hue controller 906 is transferred to the luminance control variable calculator 908. Although the image signal whose hue has been controlled is transferred to the luminance control variable calculator 908 through the controller 900 in FIG. 9, the hue controller 906 may directly transfer the image signal to the luminance control variable calculator 908.

The luminance control variable calculator 908 calculates a luminance control variable of the image signals transferred from the hue controller 906 in accordance with a control command of the controller 900. The luminance control variable calculator 908 calculates the luminance control variable to allow the color coordinates of the image signals corresponding to the color coordinates having high luminance among the image signals that can be displayed in the image display device to obtain high luminance. The procedure of calculating the luminance control variable is the same as that of calculating the hue control variable. The calculated luminance control variable is transferred to the luminance controller 910.

The luminance controller 910 controls luminance of the transferred image signals using the luminance control variable transferred from the luminance control variable calculator 908. Although the luminance controller 910 and the luminance control variable calculator 908 are separately provided in FIG. 9, it is apparent that they may be provided in a single body.

The image signals whose luminance has been controlled by the luminance controller 910 are transferred to the color space inverse converter 912. The color space inverse converter 912 performs inverse operation of the operation performed by the color space converter 902 in accordance with the control command. The controller 900 serves to control the elements of the image display device.

The procedure of controlling hue of the input image signals and the procedure of controlling luminance of the input image signals are sequentially performed as shown in FIG. 9. In other words, the procedure of controlling hue of the input image signals is first performed and then the procedure of controlling luminance of the input image signals is performed. However, the procedures of controlling hue and luminance may be performed at one time or the procedure of controlling luminance of the input image signals may be performed prior to the procedure of controlling hue of the input image signals depending on user's setting.

As described above, in the apparatus and method for controlling hue and luminance of input image signals in the image display device, the color gamut of the input image signals are converted into the color gamut that can be displayed in the image display device considering color as well as luminance. Therefore, it is possible to prevent inversion of luminance from occurring.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for converting input image signals into image signals that can be displayed in an image display device, the method comprising:
   converting color components of the input image signals and color components that can be displayed in the image display device into color space, respectively;
   comparing a converted color gamut with each other to calculate a hue control variable; and
   controlling hues of the input image signals using the hue control variable,
   wherein the comparing operation includes:
   obtaining hue and luminance corresponding to the maximum chromaticity of the input image signals and hue and luminance corresponding to the maximum chromaticity of the image signals that can be displayed in the image display device, from the converted color gamut; and
   calculating the hue control variable using the obtained hue and luminance, and
   wherein the hue control variable is a distance of the hue of the input image signal to coincide hue of the color coordinates having the maximum luminance of the input image signals with hue of the color coordinates having the maximum luminance of the image signals that can be displayed in the image display device.

2. The method according to claim 1, wherein the obtaining operation includes converting the color components into the color space that can be displayed in three color components.

3. The method according to claim 1, wherein the obtaining operation includes converting the color components into the color space that can be displayed in five color components.

4. The method according to claim 1, further comprising:
   controlling luminance of the input image signals whose hues have been controlled; and
   inverse converting the converted color space of the input image signals into the original spaces.

5. The method according to claim 4, wherein the controlling luminance of the input image signals operation includes:
   comparing the converted color gamut with each other to calculate a luminance control variable; and
   controlling luminance of the input image signals using the luminance control variable.

6. The method according to claim 5, wherein the luminance control variable corresponds to a value that matches the maximum luminance obtained from the input image signals with the maximum luminance obtained from the image signals that can be displayed in the image display device.

7. An apparatus for converting input image signals into image signals that can be displayed in an image display device, the apparatus comprising:
   a color space converter to convert color components of the input image signals and color components that can be displayed in the image display device into color space, respectively;
   a hue control variable calculator to compare the converted color gamut with each other to calculate a hue control variable; and
   a hue controller to control hues of the input image signals using the hue control variable,
   wherein the hue control variable calculator obtains hue and luminance corresponding to the maximum chromaticity of the input image signals and hue and luminance corresponding to the maximum chromaticity of the image signals that can be displayed in the image display device, from the converted color gamut, and calculates the hue control variable using the obtained hue and luminance, and
   wherein the hue control variable is a distance of the hue of the input image signal to coincide hue of the color coordinates having the maximum luminance of the input image signals with hue of the color coordinates having the maximum luminance of the image signals that can be displayed in the image display device.

8. The apparatus according to claim 7, wherein the color space converter converts the color components into the color space that can be displayed in three color components.

9. The apparatus according to claim 7, wherein the color space converter converts the color components into the color space that can be displayed in five color components.

10. The apparatus according to claim 7, further comprising:
    a luminance controller controlling luminance of the input image signals whose hues have been controlled; and
    a color space inverse converter inverse converting the converted color space of the input image signals into the original space.

11. The apparatus according to claim 10, further comprising a luminance control variable calculator comparing the converted color gamut with each other to calculate a luminance control variable, the luminance control variable calculator transferring the calculated luminance control variable to the luminance controller.

12. The apparatus according to claim 11, wherein the luminance control variable corresponds to a value that matches the maximum luminance obtained from the input image signals with the maximum luminance obtained from the image signals that can be displayed in the image display device.

13. A method for converting input image signals into image signals to output to an output device, the method comprising:
    converting color components of the input signals into color space of the output device;
    comparing a converted color gamut with each other to calculate a hue control variable; and
    controlling hues of the input image signals using the hue control variable;
    wherein the comparing operation includes:
    matching a hue and luminance corresponding to the maximum chromaticity of the input image signals and hue and luminance corresponding to the maximum chromaticity of image signals of the output device; and calculating the hue control variable using the matched hue and luminance, and wherein the hue control variable is a distance of the hue of the input image signal to coincide hue of the color coordinates having the maximum luminance of the input image signals with hue of the color coordinates having the maximum luminance of the image signals that can be displayed in the image display device.

* * * * *